Feb. 12, 1963  H. G. OSWIN  3,077,508
FUEL CELL ELECTRODES
Filed May 13, 1960
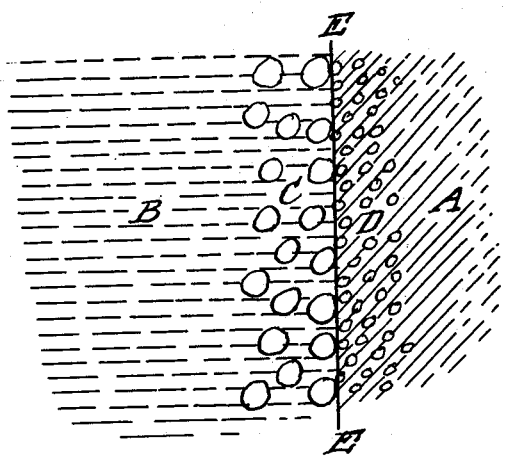
INVENTOR
Harry G. Oswin
BY Watson, Cole, Grindle & Watson
ATTORNEYS

United States Patent Office 3,077,508
Patented Feb. 12, 1963

3,077,508
FUEL CELL ELECTRODES
Harry G. Oswin, Elmsford, N.Y., assignor to Leesona Corporation, Cranston, R.I., a corporation of Massachusetts
Filed May 13, 1960, Ser. No. 28,873
10 Claims. (Cl. 136—121)

This invention relates to an improved electrode for use in fuel cells. More particularly it relates to a compacted porous carbon electrode having an activating metal uniformly and chemically bonded to the carbon particles and to the method of making such an electrode.

Priorly, the art has recognized the advantages of carbon electrodes in fuel cells, due primarily to the large surface contact area occasioned by the irregular surface of carbon particles. It is well known that catalytic efficiency of an electrode is directly related to surface contact area. However, due to polarization and similar phenomena carbon electrodes have certain practical disadvantages. To circumscribe these disadvantages electrodes have been devised from metals such as nickel, platinum, etc., or attempts have been made to coat carbon electrodes with an activating metal. To a large extent only marginal improvements have been accomplished. Electrodes prepared from nickel and platinum, notwithstanding their outstanding characteristics for use in fuel cells utilizing hydrogen gas, are relatively inefficient due to their smooth surface which provides only limited surface contact area. Electrodes made from porous carbon plates coated with an activating metal also have disadvantages. It has been found extremely difficult to uniformly coat a porous carbon plate without blocking or flooding the porous structure. As is apparent an ideal electrode should have an irregular surface, providing enhanced contact area, with an activating metal incorporated therein.

Accordingly it is an object of this invention to provide an improved fuel cell electrode having an activated metal uniformly and chemically bonded to a compacted porous carbon base.

It is another object to provide an electrode having a high degree of electrochemical stability.

It is another object of this invention to provide a biporous electrode containing an activating metal chemically bonded therein.

It is still another object of this invention to provide an improved method of making a carbon electrode having an activating metal chemically bonded therein and possessing a high degree of electrochemical stability.

These and other objects of the invention will appear from the following detailed description with particular reference to the specific illustrative examples.

Briefly the instant invention contemplates the formation of a compacted porous carbon electrode having an activating metal uniformly and chemically bonded therein to a method of making such an electrode. This is performed by saturating an ion exchange resin with a salt solution of a metal ion. After the salt solution of the metal ion has sufficiently contacted the ion exchange resin to assure substantial or complete exchange of the metal ions, the resin is washed and dried by suitable means. The washing and drying is followed by mild oxidation. The saturated resin is ground to obtain a suitable particle size, compacted with a binder and thereafter pyrolized in the range of 600–1300° C. in an inert atmosphere.

The resultant compacted porous carbon plate is eminently suited for a fuel cell electrode. Since the activating metal is an integral part of the carbon plate an electrode constructed therefrom has a high degree of thermochemical an electrochemical stability and thus, can be used in fuel cell systems utilizing solid, fused, or liquid electrolytes. Further, an electrode can be produced to fit a practitioners need as either an oxidizing electrode or as the fuel gas electrode or both. Thus, if hydrogen gas is to be used as the fuel, a nickel activated carbon plate could be selected for the fuel electrode, whereas a silver activated carbon plate would be a logical selection for the oxidizing electrode. However, if carbon monoxide or a hydrocarbon gas were chosen as the fuel gas another activating metal possibly would be selected in the construction of the carbon plate. A proper selection of an activating material is within the ability of one skilled in the art.

Hence from the above discussion it is apparent that an outstanding feature of the electrodes made from the instant activated carbon plates is their outstanding electrochemical stability, due to the activating metal being chemically bonded to the carbon particles. Priorly, since the activating metal was merely physically dispersed with the carbon particles and sintered, electrodes were produced relatively unstable to electrolytic solutions. Carbon plates merely impregnated with an activating metal by vacuum techniques, posed a problem due to blocking or flooding of the minute pores of the plate. When this phenomena occurred the advantages of the initial high surface contact area of the carbon plate was lost.

Another outstanding feature of the instant invention is the ability of one skilled in the art to construct an electrode to fulfill a particular need. If for example, a fuel cell requires a particular fuel or oxidizing gas a porous carbon plate can be produced incorporating an activating metal catalytically responsive to that particular gas. The invention is not dependent upon the selection of any particular metal. The proper choice of metal depends to an appreciable extent upon the end use of the metal activated carbon electrode. However, suitable metals are exemplified by platinums, nickel, cobalt, copper, silver, cadmium, zinc, chromium, molybdenum, etc. Any metal capable of being incorporated in an ion exchange resin can be used in this invention.

In the preparation of the metal activated carbon plates, commercially available cation exchange or anion exchange resins may be used. Cation exchange resins which depend upon the carboxyl group for their activity are particularly valuable. These resins are prepared by forming an insoluble polymer, copolymer, or heteropolymer of an unsaturated carboxyl containing compound or the equivalent thereof. Polymerization may be carried out in bulk, in solution, or in emulsion. If the starting materials are carboxylic acids, the functional groups of the acid are obtained in the acid form. If an acid anhydride is used acid groups are readily formed by reaction of the resin with water. Ester groups can be hydrolized or saponified to yield resins with free carboxylic groups. Salt forms can be converted to the carboxylic forms by treatment of the resin in salt form with an acid solution. One type of carboxylic exchanger is prepared by heteropolymerizing maleic anhydride or fumaric acid with styrene together with a cross-linking agent such as divinylbenzene. Other particularly useful starting materials for preparing carboxylic resins are acrylic acid and methacrylic acid. If these materials are polymerized into an insoluble form the resulting products are of high capacity. These acids may also be copolymerized with polyunsaturated polymerizable compounds such as divinylbenzene, trivinylbenzene, ethylene diacrylate, or dimethacrylate, diallyl maleate or fumerate to yield insoluble carboxylic resins effective as cation exchangers. Additionally, phenolic sulfonic acid, polystyrene sulfonic acid, or polystyrene sulfonic acid resins containing activated hydroxyl groups can be used as the cation exchange resin.

Anion exchange resins can also be used in this invention exemplified by the strongly basic type. An example is a resin in which a three dimensional cross-linked co-polymer of a monovinyl hydrocarbon, preferably styrene and a cross-linking polyvinyl hydrocarbon, preferably divinylbenzene in the form of small spheroids is chloromethylated and then aminated by reaction with a tertiary amine. Since the porosity of these resins is inversely proportional to the amount of co-polymerized cross-linking polyvinyl hydrocarbon and since the more porous or less dense resins have proven to be more efficient and more satisfactory for making the instant porous carbon plate, it is recommended that a resin be used which has only a limited amount of polyvinyl hydrocarbon based on the total weight of co-polymerized monovinyl hydrocarbon and polyvinyl hydrocarbon. What is needed for more efficient operation is a resin with very large surface area either by virtue of being very porous or by virtue of being in a finally divided state. Anion exchange resins, which are available commercially, are further exemplified by the products of U.S. Patents 2,540,985, 2,591,573 and 2,614,099.

It is to be understood that the formation of ion exchange resins or the use of any particular ion exchange resin does not constitute a part of this invention. However, the carboxylic acid type cation exchange resins free of nitrogen and sulphur are preferred. Examples of such resins are those marketed by the American Zeolite Corporation under the tradename Ionac C–265 and C–270 or those marketed by Chemical Process Company under the tradename Duolite C–62, C–63 and CS–101. Similarly the Permutit Company and Rohm & Haas Company market a number of suitable resins under the tradenames Permutit and Amberlite respectively. Amberlite resins CG–50 and Amberlite IRC–50 have been found to be particularly suitable. Similarly there are a host of anion exchange resins available.

A typical procedure for preparing an activated porous carbon plate from an ion exchange resin is shown in the following example. Parts are by weight unless otherwise specified.

*Example 1*

20 parts of the cation exchange resin marketed by Rohm & Haas under the tradename Amberlite IRC–50, a methacrylate resin having free carboxyl groups, was ground to a fine powder and immersed in distilled water for 48 hours to permit easy exchange of the cation. The resin in the swelled condition was contacted with a salt solution of 1% palladium nitrate to which sufficient ammonia has been added to complex the palladium ammonium ion. After contact for several days the resin was filtered and washed with distilled water to remove excess nitrate solution and dried under vacuum for 24 hours at 75° C. The resin was subjected to mild oxidation in an air oven for 4–6 hours at 350° C. The partially oxidized material was ground and sieved, and compacted with 5% coal tar pitch in methyl ethyl ketone solvent. The material was pressed at 3000 p.s.i. for 5 minutes at 200° C. and thereafter directly pyrolized in a furnace at 1050° C., in an inert atmosphere, for 3½ hours. The resultant metal activated porous carbon plate was tested as an electrode in a fuel cell. The electrode exhibited an unusually high degree of electrochemical stability when used with fused, solid or liquid electrolytes.

In the preparation of activated carbon plates, the amount of activating metal present in the final carbon product can be controlled by the concentration of the ion solution, the length of contact time between the ion solution and the resins, and by the particle size of the ion exchange resins. The metal content is preferably within the range of from about 0.1–20% of the total resin on an atomic basis. However depending upon the use of the electrode and the weight of the particular activating metal employed it may be desirable to deviate from this range.

A second embodiment of the instant invention is the preparation of a bi-porous structure having a thin outer fine pore layer of metal activated carbon imposed upon a relatively coarse pore carbon plate. The coarse pore plate can suitably be either metal activated or simply porous carbon. The electrode utilizing a bi-porous structure will function as illustrated diagramatically in the drawing. Referring to the drawing, the gas B on the left hand side of the electrode is under super-atmospheric pressure so that the same is forced into the pores C against the capillary pressure of the electrolyte A on the right hand side of the wall. A three phase boundary, E, between the gas, electrolyte and electrode occurs where the adsorption and de-adsorption and thus, generation of the electrochemical force occurs.

In the prior art it has been found that if the pores are too small, as for example the pores at D, in relation to the surface tension of the electrolyte, the electrolyte will completely enter the same due to the capillary action and block the pores, rendering them unavailable for the production of electrochemical energy. On the other hand if the pores are too large as for example the pores of the size at C the gas simply passes through because of the low capillary counter pressure of the electrolyte and escapes unused. By the use of a bi-porous structure, as illustrated, this problem is eliminated to a large extent.

The instant invention provides a convenient method of making a metal activated bi-porous structure. As stated hereinbefore it is possible to have both the coarse and fine pore units of the bi-porous structure metal activated or it may be desirable to have simply the fine pore structure metal activated.

The following example sets forth a typical procedure for making a bi-porous structure.

*Example 2*

20 parts of cation exchange resin marketed by Chemical Process Company under the tradename Duolite CS–101, an acrylic carboxylic acid resin was crushed or broken to form fine granules. The resin was immersed in a dilute aqueous ammonia solution for a period of 48 hours to permit easy exchange of the cation. The swelled resin was then contacted with a salt solution of 30 grams of nickel chloride made up to 1000 grams with distilled water. After several days contact the resin was filtered, dried, and immersed in a fresh salt solution of nickel chloride. This process was repeated twice in order to exchange all available sites. The resin was again filtered, washed with distilled water to remove any excess salt solution and dried in an air oven for 24 hours at 80° C.

The resin was subjected to mild oxidation treatment in an air oven for 5 hours at 350° C. The oxidized material was pre-pyrolized for 1½ hours in an inert atmosphere at 500° C. The pre-pyrolized material was ground into a fine powder, sieved, and compacted with 10% of a phenolic formaldehyde resin in a thin layer (0.01 inch thick) on one surface of a coarsely porous carbon structure having 50% of the pore volume in the 10–100$\mu$ range. The compact was then pyrolized at 950° C. for a period of 3½ hours in an inert atmosphere. The resulted structure was bi-porous, having a thin, high surface area metal-containing carbon layer with pores of 1$\mu$ less supported by a thick carbon layer having pores in the 100–10$\mu$ range.

The resultant bi-porous plate was tested as an electrode in fuel cells using liquid, fused, and solid electrolytes. The electrode was found to exhibit an extraordinarily high degree of electrochemical stability. In addition it was found that only a minute amount of gaseous fuel passed through the electrode in the unused state.

It should be appreciated that the instant invention is not directed to any particular method of carbonizing the metal containing ion exchange resins to form the compacted porous carbon plates. This is a known and specialized art. The instant invention can be practiced utilizing any of the known methods employing conventional binders and equipment. Nor is the invention to be construed as being limited by the illustrative examples. It is possible to produce still other embodiments, such as varying pores size etc., without departing from the inventive concept herein disclosed. Such embodiments are within the ability of one skilled in the art.

Having thus described the invention, what is claimed as new and desired to be secured by Letters Patent is:

1. An electrode for a fuel cell comprising a bi-porous carbon plate having a catalytically activating metal chemically bonded therein, said carbon plate being formed by carbonizing an ion exchange resin containing metal ions upon the surface of a porous compacted carbon plate.

2. The electrode of claim 1, wherein the ion exchange resin is a cation exchange resin.

3. The electrode of claim 2, wherein the cation exchange resin contains carboxyl groups.

4. An electrode for a fuel cell comprising a carbon plate having a catalytically activating metal chemically bonded therein, said carbon plate being formed by carbonizing an ion exchange resin containing metal ions.

5. The electrode of claim 4, wherein the ion exchange resin is a cation exchange resin.

6. The electrode of claim 5, wherein the cation exchange resin contains carboxyl groups.

7. The method of making a porous compacted carbon plate containing an activating metal incorporated therein, for use in fuel cell electrodes, comprising contacting an ion exchange resin with a salt solution of a metal and pyrolizing said ion exchange resin to form a compacted porous carbon plate.

8. The method of claim 7, wherein the ion exchange resin is a cation exchange resin.

9. The method of claim 8, wherein the cation exchange resin contains carboxyl groups.

10. The method of making a bi-porous compacted carbon plate containing an activating metal incorporated therein, for use in fuel cell electrodes, comprising (1) contacting an ion exchange resin with a salt solution of a metal, (2) compacting said resin with a binder, (3) superimposing the compacted resin upon a porous carbon plate and (4) carbonizing the resin.

References Cited in the file of this patent

UNITED STATES PATENTS

| | | |
|---|---|---|
| 1,716,606 | Snelling | June 11, 1929 |
| 1,856,680 | Williams et al. | May 3, 1932 |
| 2,540,985 | Jackson | Feb. 6, 1951 |